June 7, 1949.　　　　F. K. SLASON　　　　2,472,127
TEMPERATURE COMPENSATED VIBRATION PICKUP
Filed Feb. 15, 1946
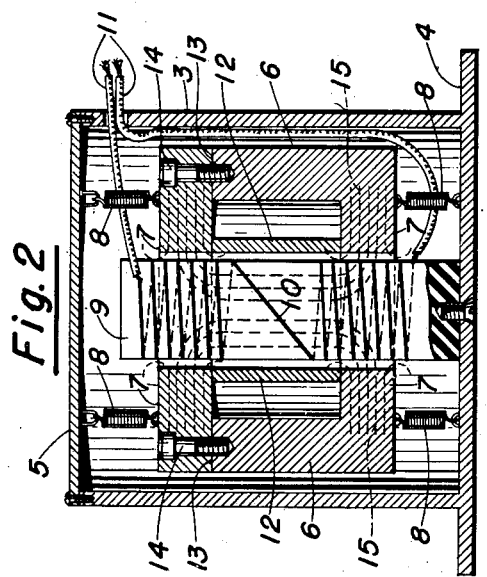
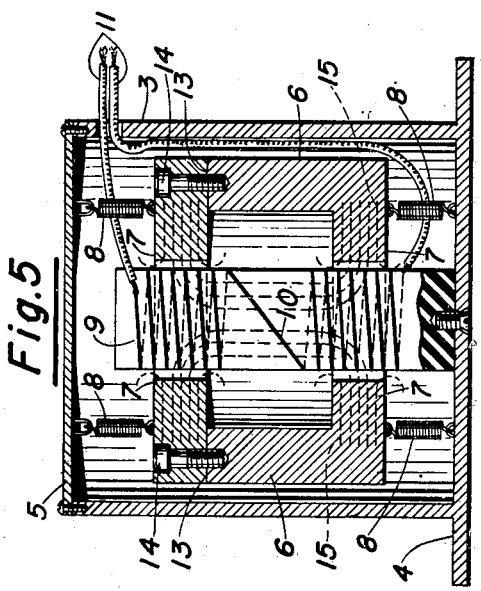
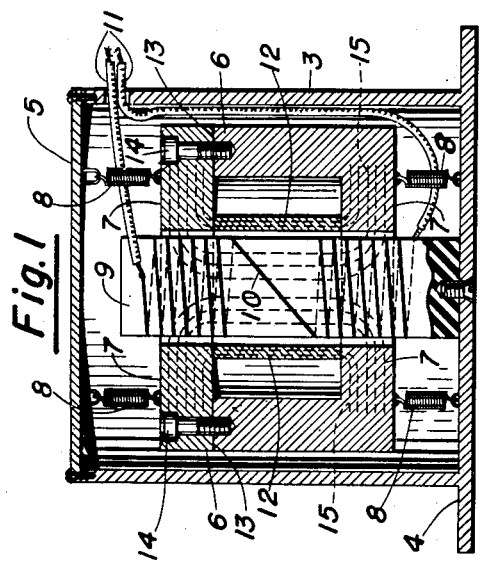
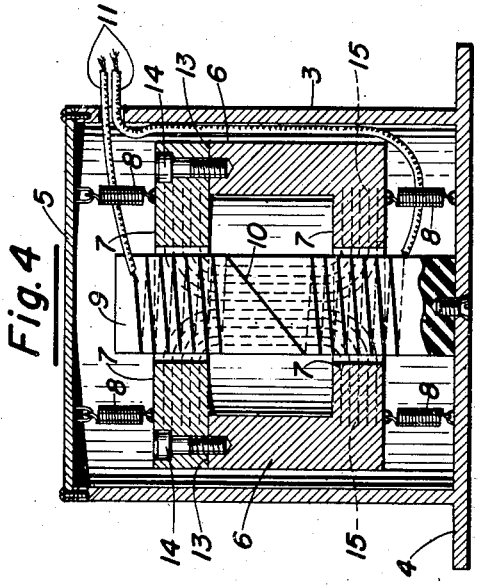
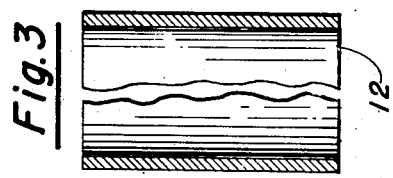
Inventor
Frank K. Slason
By
*Attorney*

Patented June 7, 1949

2,472,127

UNITED STATES PATENT OFFICE 2,472,127

TEMPERATURE COMPENSATED VIBRATION PICKUP

Frank K. Slason, United States Navy

Application February 15, 1946, Serial No. 647,986

6 Claims. (Cl. 171—209)

(Granted under the act of March 3, 1883, as amended April 30, 1928; 370 O. G. 757)

This invention relates to improvements in devices for compensating for the effect of the ambient temperature upon vibration pick-ups employing the electromagnetic principles.

Vibration pick-up instruments of this type consist essentially of an alternating current generator having a permanent field magnet of very high flux value, such as Alnico and a sensitive armature coil disposed within the field of flux. Motion is transmitted to the generator by translating the vibrations of the object under observation to either the field magnet or armature coil by amplitude springs. An electric current is thus set up in the generator and the intensity of the vibration is proportional to the number of lines of magnetic flux cut by the armature coils in a unit of time, or in other words, to the current produced by the generator. This electric current is very weak and is amplified by any suitable electronic amplifier. The amplitude of the vibration under observation is taken as a quantitive reading on the electric amplifier by an oscilloscope, or the like. The frequency of the vibration under observation is taken directly by a frequency meter from the electronic amplifier. An instrument of the general type described above gives quite accurate vibration readings when operated at the temperature for which the instrument is calibrated, but a change in the ambient temperature has a marked effect upon the sensitivity of these instruments, as originally calibrated, in that as the temperature increases the sensitivity of the pick-up is reduced due to the effect upon the permeability of the magnetic circuit. That is to say, a vibration of the same amplitude or intensity will give a higher quantitive current reading at lower temperatures and a lower quantitive current reading at higher temperatures. The reason for this variation in current has been found to be because the lines of magnetic flux, which an armature coil is capable of cutting as the coil moves at a given rate in relation to the field setting up the lines of magnetic flux, is inversely related to the temperature of the coil and field. That is to say, the lower the temperature the more lines of force a field coil is capable of cutting, and the more current there will be generated for a vibration of a given amplitude and frequency. Again, conversely, the higher the temperature the fewer lines of force the field coil is capable of cutting. In most cases instruments adapted for measuring vibrations must be operated under conditions which have a wide and uncontrolled variation in temperature, as in the case of aircraft while in flight.

Accordingly it is the object of this invention to provide an electromagnetic vibration pick-up that is self-compensating for temperature variations below the demagnetization temperature of ferrous alloys.

Other objects and advantages of this invention will become apparent as the discussion proceeds and is considered in connection with the claims and accompanying drawings wherein like characters of reference designate like parts in the several views and wherein:

Fig. 1 is a cross sectional illustrative view of an electromagnetic vibration pick-up with the compensator embodied in this invention illustrating the flow of magnetic flux through armature and coils at lower temperatures.

Fig. 2 is a cross sectional illustrative view of an electromagnetic vibrations pick-up, with the compensator embodied in this invention illustrating the flow of magnetic flux through the armature and coils at higher temperatures.

Fig. 3 is a cross sectional view of the magnetic flux shunt embodied in this invention.

Fig. 4 is a cross sectional illustrative view of an electro-magnet vibration pick-up, without the compensator embodied in this invention illustrating the flow of magnetic flux through the armature coils at lower temperature.

Fig. 5 is a cross sectional illustrative view of an electromagnet vibration pick-up, without the compensator embodied in this invention, and illustrates the flow of magnetic flux through armature coils at higher temperatures.

Referring now to the drawings wherein, for the purpose of illustration only, is shown a preferred embodiment of this invention, the numeral 3 designates a case or housing having a base plate 4 adapted to be firmly secured by any suitable means such as clamps, screws or the like (not shown), to any object (also not shown), the vibration characteristics of which are under observation. A top member 5, serves as a closure for the housing. A permanent field magnet 6, with poles 7, preferably of some metal having a high flux value such as "Alnico," is suspended between the plate 4 and the solid top member 5 by amplitude magnifying springs 8. An armature 9 having series wound coils 10, as shown, is rigidly affixed by a screw or welding at one end to the base plate 4 and is juxtapositioned in the field of the magnet 6 to complete the structure of an alternating current generator. Leads 11, which communicate with the coils 10, conduct the current set up within the armature 9 and its coils 10 to any suitable electronic amplifier (not shown), where the alternating current is amplified and recorded. A magnetic flux shunt 12, having an appreciable negative temperature coefficient of permeability, is provided parallel to the generating portion of the magnetic circuit across the poles 7 of the permanent magnet 6, as shown in Figs. 1 and 2. The magnet 6 is split at 13 to permit assembly of the shunt 12, as shown. Screws 14 hold the magnet together.

A number of magnetic materials having an appreciable negative temperature coefficient of permeability are known and could very well be used in the shunt 12. The better known of these materials being certain alloys of nickel and iron and nickel and copper. However, it is recommended that an alloy consisting of the following approximate composition will give the better result:

30–40% nickel
Small amounts of manganese, chromium and silicon
Balance iron

The specific dimensions of the shunt would, of necessity, be individually determined for any particular case.

A comparison of Figs. 1, 2, 4, and 5 will give a clear understanding of the operation and function of this invention. As it has been pointed out earlier in this specification, temperature variations will affect the lines of magnetic flux represented by dotted lines 15, that the armature and its coils will cut, as illustrated in Figs. 4 and 5. The function of this invention is to prevent some of these lines of flux present in the magnetic field, from reaching the armature and coils at lower temperatures and not disturb the lines of flux in the magnetic field at higher temperatures. This is accomplished by inserting the magnetic flux shunt 12 across the poles 7 of the magnet 6. The desired result (compensating for temperature variations) is obtained due to the fact that the said shunt will by-pass more lines of magnetic force at lower temperatures and will at higher temperatures reject more lines of magnetic force leaving them available to the armature. Thus the armature receives a constant number of lines of flux over a wide temperature range.

It is to be understood that the form of this invention, herewith shown and described, is to be taken as a preferred example of the same, and that various changes in the shape, size and arrangement of parts may be resorted to, without departing from the spirit of this invention, or the scope of the sub-joined claims.

The invention herein described and claimed may be manufactured and used by or for the Government of the United States of America for governmental purposes without the payment of any royalties thereon or therefor.

I claim:

1. A temperature compensated vibration pick-up instrument comprising a housing, a cylindrical permanent field magnet suspended within the said housing by resilient amplitude means, said magnet having annular inwardly extending flanges at its ends constituting its poles, a wound armature located in the magnetic field and a magnetic flux shunt having an appreciable negative temperature coefficient of permeability extending between said flanges.

2. A temperature compensated vibration pick-up instrument comprising an annular permanent magnet resiliently mounted for limited axial displacement and having an internally turned U-shaped axial cross-section, so as to form annular axially spaced poles, a soft iron core located centrally thereof extending between said poles, a pair of coils around said core at said poles, connected in series and wound for inducing opposite polarity by axial movement of the permanent magnet relative thereto, and a cylindrical sleeve fixed between the inner edges of said poles and having a negative temperature coefficient of permeability, for by-passing more of the magnetic flux at lower temperatures than at higher temperatures and to maintain the flux through said soft iron core substantially constant.

3. A temperature compensated vibration pick-up instrument comprising an annular permanent magnet resiliently mounted for limited axial displacement in accordance with the intensity and frequency of axial vibration of said instrument, and having an internally turned U-shaped axial cross-section, so as to form annular axially spaced poles, a soft iron core located centrally thereof extending between said poles, a pair of coils around said core at said poles, connected in series and wound for inducing opposite polarity by axial movement of the permanent magnet relative thereto, and a cylindrical sleeve fixed between the inner edges of said poles and having a negative temperature coefficient of permeability, for by-passing more of the magnetic flux at lower temperatures than at higher temperatures and to maintain the flux through said soft iron core substantially constant.

4. A temperature compensated vibration pick-up instrument comprising a housing, a permanent field magnet, a wound armature in the housing and positioned in the field of said magnet, said magnet being resiliently mounted in said housing for axial displacement with respect to said armature, and a magnetic flux shunt having a negative temperature coefficient of permeability positioned in the field of said magnet and parallel thereto for by-passing a portion of the magnetic flux thereof.

5. A temperature compensated vibration pick-up instrument comprising a housing, a magnetic field generating element in said housing, a wound armature element in said housing and positioned in the field of said generating element, one of said elements being resiliently mounted on said housing for translational displacement with respect to the other in accordance with the vibrations to be measured, and a magnetic flux shunt having a negative temperature coefficient of permeability positioned in the field of said generating element and parallel thereto for by-passing a portion of the magnetic flux thereof.

6. In a temperature compensated vibration pick-up device, a magnetic flux generating element, a wound armature element positioned in the field of said generating element, said elements being relatively axially displaceable in accordance with the vibrations to be measured, and a magnetic flux shunt having a negative temperature coefficient of permeability positioned in the field of said magnet and parallel thereto for by-passing a portion of the magnetic flux thereof.

FRANK K. SLASON.

REFERENCES CITED

The following references are of record in the file of this patent:

UNITED STATES PATENTS

| Number | Name | Date |
|---|---|---|
| 2,058,339 | Metzger | Oct. 20, 1936 |
| 2,158,132 | Legg | May 16, 1939 |
| 2,245,268 | Goss et al. | June 10, 1941 |
| 2,286,897 | Costa et al. | June 16, 1942 |
| 2,426,322 | Pridham | Aug. 26, 1947 |